(12) United States Patent
D'Amico et al.

(10) Patent No.: US 7,697,450 B2
(45) Date of Patent: Apr. 13, 2010

(54) METHOD AND APPARATUS FOR BROADCAST IN AN AD HOC NETWORK WITH DYNAMIC SELECTION OF RELAY NODES

(75) Inventors: Thomas V. D'Amico, Inverness, IL (US); Avinash Joshi, Orlando, FL (US); Michael D. Kotzin, Buffalo Grove, IL (US); Sivakumar Muthuswamy, Tower Lakes, IL (US)

(73) Assignee: Motorola, Inc., Schaumburg, IL (US)

( * ) Notice: Subject to any disclaimer, the term of this patent is extended or adjusted under 35 U.S.C. 154(b) by 962 days.

(21) Appl. No.: 11/289,833

(22) Filed: Nov. 30, 2005

(65) Prior Publication Data

US 2007/0121521 A1 May 31, 2007

(51) Int. Cl.
H04L 12/26 (2006.01)
(52) U.S. Cl. .................................. 370/252; 370/312
(58) Field of Classification Search ................ 370/229, 370/230, 235, 238, 312, 328, 329, 331, 332, 370/338, 351, 389, 400, 254, 252, 253, 310, 370/315, 316; 455/7, 9, 11.1, 69, 522; 709/238
See application file for complete search history.

(56) References Cited

U.S. PATENT DOCUMENTS

| | | | | |
|---|---|---|---|---|
| 5,862,476 | A * | 1/1999 | Hasegawa | 455/432.2 |
| 6,961,310 | B2 * | 11/2005 | Cain | 370/238 |
| 7,007,102 | B2 * | 2/2006 | Billhartz et al. | 709/238 |
| 7,266,386 | B2 * | 9/2007 | Kim et al. | 455/522 |
| 7,493,080 | B2 | 2/2009 | Scaglione | |
| 2004/0165532 | A1 * | 8/2004 | Poor et al. | 370/238 |
| 2005/0113084 | A1 | 5/2005 | Scaglione | |
| 2005/0143013 | A1 * | 6/2005 | Jha | 455/69 |
| 2005/0239414 | A1 * | 10/2005 | Mason et al. | 455/69 |
| 2006/0045066 | A1 * | 3/2006 | Choi et al. | 370/351 |
| 2006/0092855 | A1 * | 5/2006 | Chiu | 370/254 |

OTHER PUBLICATIONS

Paruchuri, et al. "Optimized Flooding Protocol for Ad Hoc Networks", Nov. 12, 2003, 10 Pages.
Scott, et al. "Dynamic Probabilistic Retransmission in Ad Hoc Networks", Computer Science Dept. Florida State University, Tallahassee, FL, Jun. 2004.

* cited by examiner

Primary Examiner—Ricky Ngo
Assistant Examiner—Gary Mui
(74) Attorney, Agent, or Firm—Randi L. Karpinia; Anthony P. Curtis (57) ABSTRACT

Techniques are provided for allowing a node (300) in an ad hoc network to deterministically decide whether to relay broadcast information to another node in the ad hoc network. The node (300) receives broadcast information and measures received signal strength (RSS) of the broadcast information. The node (300) may determine if the measured RSS is below a low threshold, and if so, can relay the broadcast information to neighbor nodes. Otherwise, the node (300) can also determine if the measured RSS is above a high threshold, and if not, wait for a waiting period before relaying the broadcast information to the neighbor nodes. The node (300) may dynamically adjust the low threshold by decreasing the low threshold as the number of neighbor nodes increases and may dynamically adjust the high threshold by increasing the high threshold as the number of neighbor nodes decreases.

22 Claims, 7 Drawing Sheets

METHOD AND APPARATUS FOR BROADCAST IN AN AD HOC NETWORK WITH DYNAMIC SELECTION OF RELAY NODES

FIELD OF THE INVENTION

The present invention relates generally to wireless communications and more particularly to ad hoc networks.

BACKGROUND

Wireless networks have experienced increased development in the past decade. Two types of wireless networks are infra-structure based wireless networks, and ad hoc wireless networks.

An infra-structure based wireless network typically includes a communication network with fixed and wired gateways. Many infra-structure based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and start communicating with the wired network through the new base station.

In comparison to infra-structure based wireless networks, such as cellular networks or satellite networks, ad hoc networks are self-forming networks which can operate in the absence of any fixed infrastructure, and in some cases the ad hoc network is formed only of mobile nodes. An ad hoc network typically includes a number of geographically-distributed, potentially mobile units, some times referred to as "nodes" which are wirelessly connected to each other by one or more links (e.g., radio frequency channels). The nodes can communicate with each other over a wireless media without the support of an infra-structure based or wired network. Ad hoc networks are also self-healing. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that their transmission range is usually relatively limited in comparison to cellular networks. Each node can typically communicate directly over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("hop-by-hop") until the packets reach the destination node. Each intermediate node acts as a router which can intelligently route the packets (e.g., data and control information) to another node until the packets eventually reach their final destination. To assist with relaying of packets, each node may maintain routes or routing information to other nodes in the network and can utilize routing techniques to adapt to changes in the interconnectivity between nodes. The nodes can maintain this routing information by performing periodic link and topology updates. Alternatively, nodes may discover routing information only when needed, instead of utilizing updates to maintain routes.

Broadcasting in an ad hoc network relies on nodes to repeat a broadcast until all nodes have received the broadcast message. To avoid excessive broadcast traffic, each node receiving a broadcast message determines if it should rebroadcast the message. For example, a message received more than once by a node should not be rebroadcast by the node. It is desirable to minimize the number of broadcast messages while also ensuring reliable broadcast (e.g., every node will receive each broadcast message). One approach to transmitting broadcast messages in an ad hoc network is known as "flooding."

Figure 1:
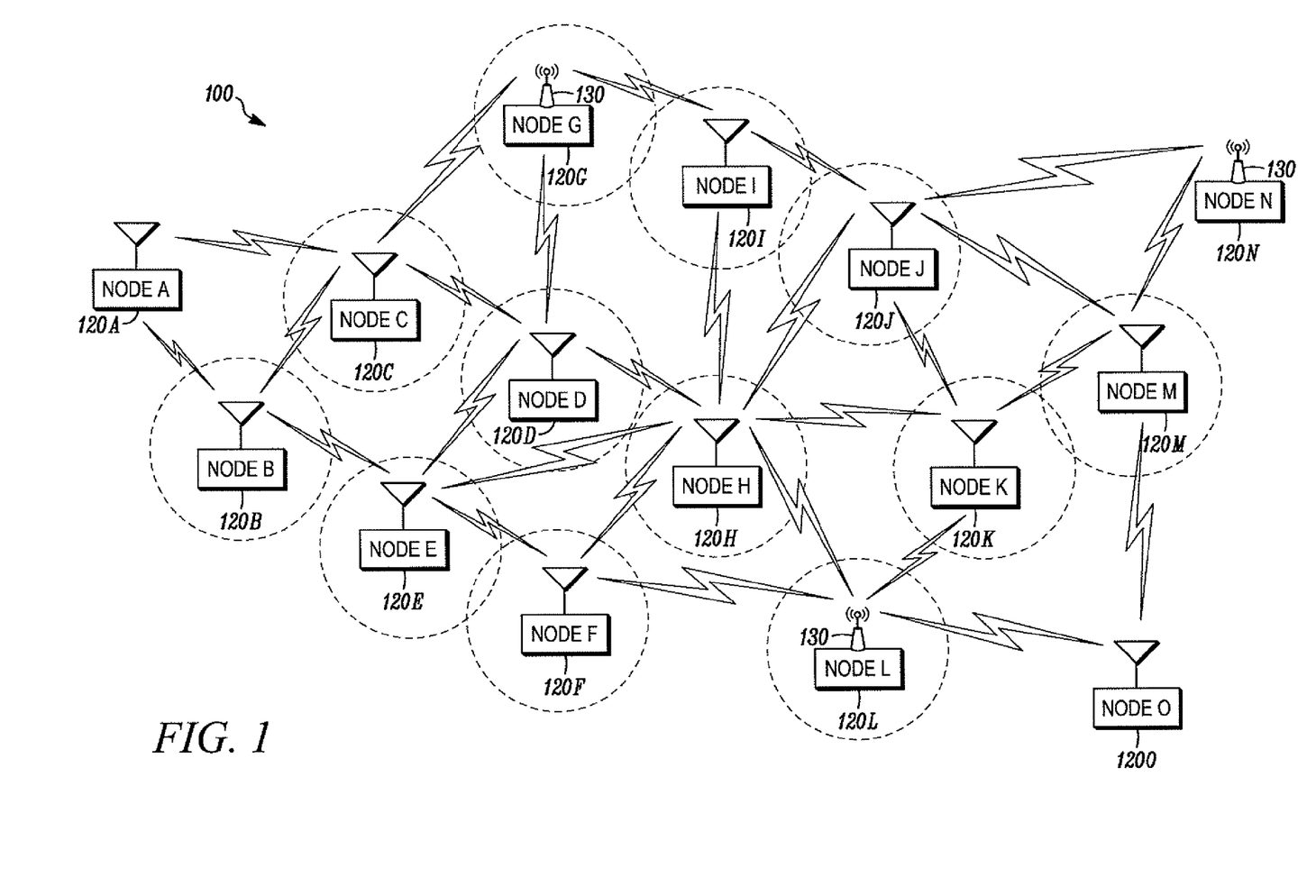
FIG. 1 is a block diagram of an exemplary ad hoc communication network which illustrates a "flooding" approach for broadcasting a broadcast packet from node A to other nodes in the ad hoc network.

FIG. 1 is a block diagram of an ad hoc communication network 100 operating in an infrastructured mode in which a wireless network is created between a plurality of nodes 120A-120O each having wireless repeater and routing capability, and in which three of the nodes 120G, 120L, and 120N are wired Access Points (APs) 130. The ad hoc communication network 100 can implement routing intelligence, which is typically distributed among nodes 120A-120O among APs 130, to help eliminate bottlenecks and improve overall network performance. If access to a wired network is desired, nodes 120A-120O can hop to an AP (typically to the AP that is closest, but to an alternate AP if their current AP is congested or fails). This wireless backhaul mesh can reduce system backhaul costs while increasing network coverage and reliability. It should be appreciated that while the ad hoc network 100 in FIG. 1 is shown as operating with wired APs, the ad hoc network 100 of FIG. 1 does not require any wired network to be present. Rather, the nodes 120A-120O can support peer-to-peer communication without the need for wired infrastructure or other networks.

Figure 4:
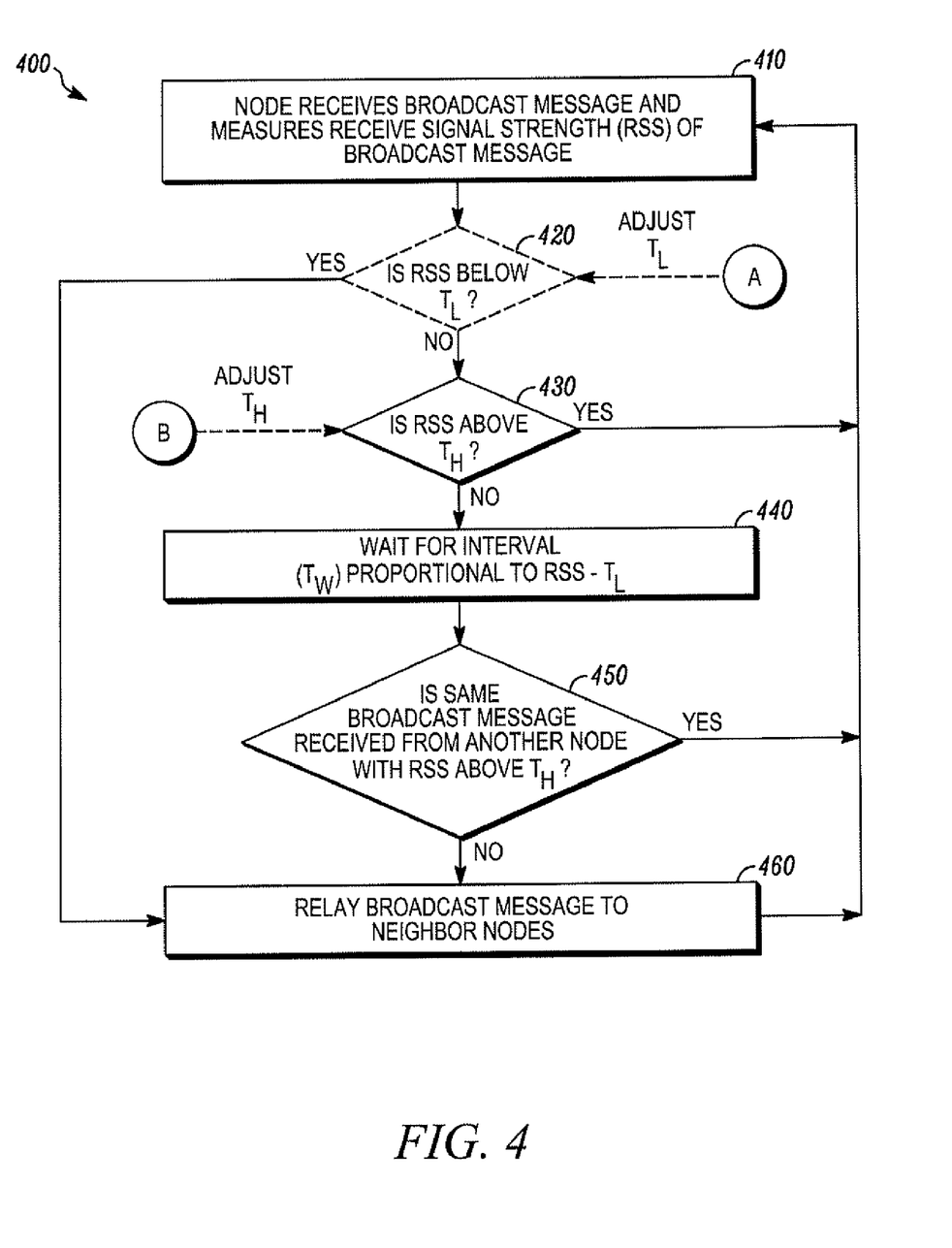
FIG. 4 is a flowchart showing an exemplary method for allowing a node in an ad hoc network to deterministically decide whether to relay broadcast information to another node in the ad hoc network in accordance with some embodiments of the invention.

In the ad hoc network 100, communications to or from nodes 120A-120O can "hop" through each other to reach other nodes 120A-120O in the network. The nodes 120A-120O comprise any wireless devices capable of receiving, transmitting and relaying packetized audio, video and/or data information to another node. Some of the components in an exemplary node, such as an appropriate processor, transmitter, receiver and antenna, are described below. Nodes in close proximity to the APs 130 can receive transmissions from other nodes utilizing the ad hoc air interface and relay these transmissions to infrastructure equipment via uplink communication signal utilizing a cellular, BLUETOOTH or WLAN air interface. Similarly, nodes in close proximity to the APs 130 can receive downlink communications over the cellular, BLUETOOTH or WLAN air interface and transmit uplink communications to another node via the ad hoc air interface. In FIG. 4, it is assumed that node A 120A will eventually transmit a broadcast packet or message using a relay approach, but that relay nodes have not yet been selected. The nodes 120A-120O can communicate information packets over wireless carrier frequencies, each of which includes one or more wireless communication channels depending on the multiple access scheme utilized in the network 100.

The access points 130 are typically coupled to a wired network (not shown) and can provide one or more sources of audio, video and/or data information. The access points 130 may be a cellular base station, a wireless local area network (WLAN) access points such as those complying with the IEEE 802.11 standard, or may also be a Bluetooth access point or the like. Although not shown in FIG. 1, it should be appreciated that the nodes 120A-120O, can also communicate information packets with a cellular-based network (not shown) over wireless carrier frequencies, each of which includes one or more wireless communication channels depending on the multiple access scheme utilized in the cellular-based network. Examples of multiple access schemes which can be used in the network can include any one or more of time division multiple access (TDMA), direct sequence or frequency hopping code division multiple access (CDMA), frequency division multiple access (FDMA), orthogonal frequency division multiplexing (OFDM), opportunity driven multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

FIG. 1 illustrates a "flooding" approach for broadcasting a broadcast packet from node A 120A to other nodes 120B-120O in the ad hoc network. Each node 102A-120O may advertise its presence by periodically broadcasting for an advertisement message. In response to the advertisement message, other nodes within range may acknowledge their presence by identifying themselves. In turn, each node may identify its neighbor nodes, and maintain a neighbor list of nodes in proximity to that node. As used herein, a "neighbor node" is a node which is one hop away from the node such that the nodes may communicate with each other. At the particular instant in time shown in FIG. 1, node D 120D, for example, has four neighbor nodes—node C 120C, node E 120E, node G 120G, and node H 120H. A particular node's neighbor list changes dynamically as the topology of the network changes.

According to this "flooding" approach, each node initially receiving the broadcast packet from node A 120A acts as a "repeater" node (indicated by the dashed-line circle) that transmits the broadcast packet to all of its neighbor nodes. This process continues until all nodes have received the broadcast packet. For example, when a node B 120B receives a packet, node B 120B determines whether the received packet is a broadcast packet. If the received packet is a unicast packet, then node B 120B transmits the packet to the neighboring node it is addressed to or intended for. If the received packet is a broadcast packet, then node B 120B transmits the received broadcast packet to each of its neighbor nodes. In this exemplary topology, node B 120B transmits the broadcast packet received from node A 120A to its neighbor nodes, Node C 120C and Node E 120E. At the same time, node C 120C transmits the broadcast packet received from node A 120A to its neighbor nodes Node B 120B, Node D 120D, and Node G 120G. To continue propagating the broadcast packet through the network 110, Node D 120D, Node E 120E and Node G 120G (e.g., the nodes receiving the broadcast packet from the repeater nodes Node B 120B, Node C 120C), then serve as a repeater node (indicated by the dashed-line circle) that transmits the broadcast packet to all of its neighbor nodes. For example, Node D 120D would transmit the broadcast packet to each of its four neighbor nodes—node C 120C, node E 120E, node G 120G, and node H 120H. Thus, broadcast packet transmission via flooding can potentially raise the reliability of transmission since a given node's probability of receiving the broadcast packet from at least node tends to be relatively high.

However, in many network topologies, the same node is likely to receive and/or transmit the same broadcast packet more than once. For example, after initially receiving the broadcast packet from node A 120A, node C 120C would receive it at least two more times from node B 120B and node D 120D and possibly also from node G 120G. Thus, using the flooding approach to broadcast packets can generate excessive amounts of system traffic which can unnecessarily consume bandwidth since the same data is redundantly received and/or transmitted. This approach can also increase the probability of channel congestion, overload and/or interference in the ad hoc network since each node transmits the broadcast packet to its neighbor nodes upon receipt. As a result, the likelihood of packet collisions increases since some nodes overlap but do not have mechanisms (e.g., centralized controller) for adjusting the timing in overlapping transmission areas. In addition, signaling messages greatly increase since every node rebroadcasts the broadcast packets. Moreover, flooding methods are not scalable.

A number of alternatives to the flooding method have been proposed for broadcasting in ad hoc networks. One approach is to elect a subset of relay nodes that form a backbone network for relaying broadcast messages. However, in high mobility ad hoc networks these techniques can be inefficient due to the high frequency at which links between nodes tend to break and the rapidity of other topology changes.

According to another approach, the probability of retransmission is modified based on local density of the network. According to yet another approach, receiving nodes utilize predetermined criterion to decide whether to retransmit the received information. According to still another approach, location is used to optimize broadcasts; each node transmits its location with the broadcast message and other nodes calculate their distance from the source or relay node in order to decide whether to rebroadcast.

Notwithstanding these advances, it would be desirable to provide broadcast protocols for use in ad hoc networks which exhibit improved broadcast efficiency. For example, it would be desirable to provide techniques which can make the transmission more orderly and thereby reduce the number of redundant broadcast packets a given node receives. It would also be desirable to provide techniques that can reduce the likelihood of broadcast packet collisions. It would also be desirable to provide techniques for dynamically relaying broadcast messages throughout an ad hoc network while minimizing the number of relay transmissions.

BRIEF DESCRIPTION OF THE FIGURES

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to techniques for allowing a node to deterministically decide whether to relay broadcast information to another node in an ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for allowing a node to deterministically decide whether to relay broadcast information to another node in an ad hoc network. The non-processor circuits may include, but are not limited to, a radio receiver, a radio transmitter, signal drivers, clock circuits, power source circuits, and user input devices. As such, these functions may be interpreted as steps of a method for allowing a node to deterministically decide whether to relay broadcast information to another node in an ad hoc network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, a "node" refers to any wireless device capable of receiving, transmitting and/or relaying packetized audio, video and/or data information to another node.

Figure 2:
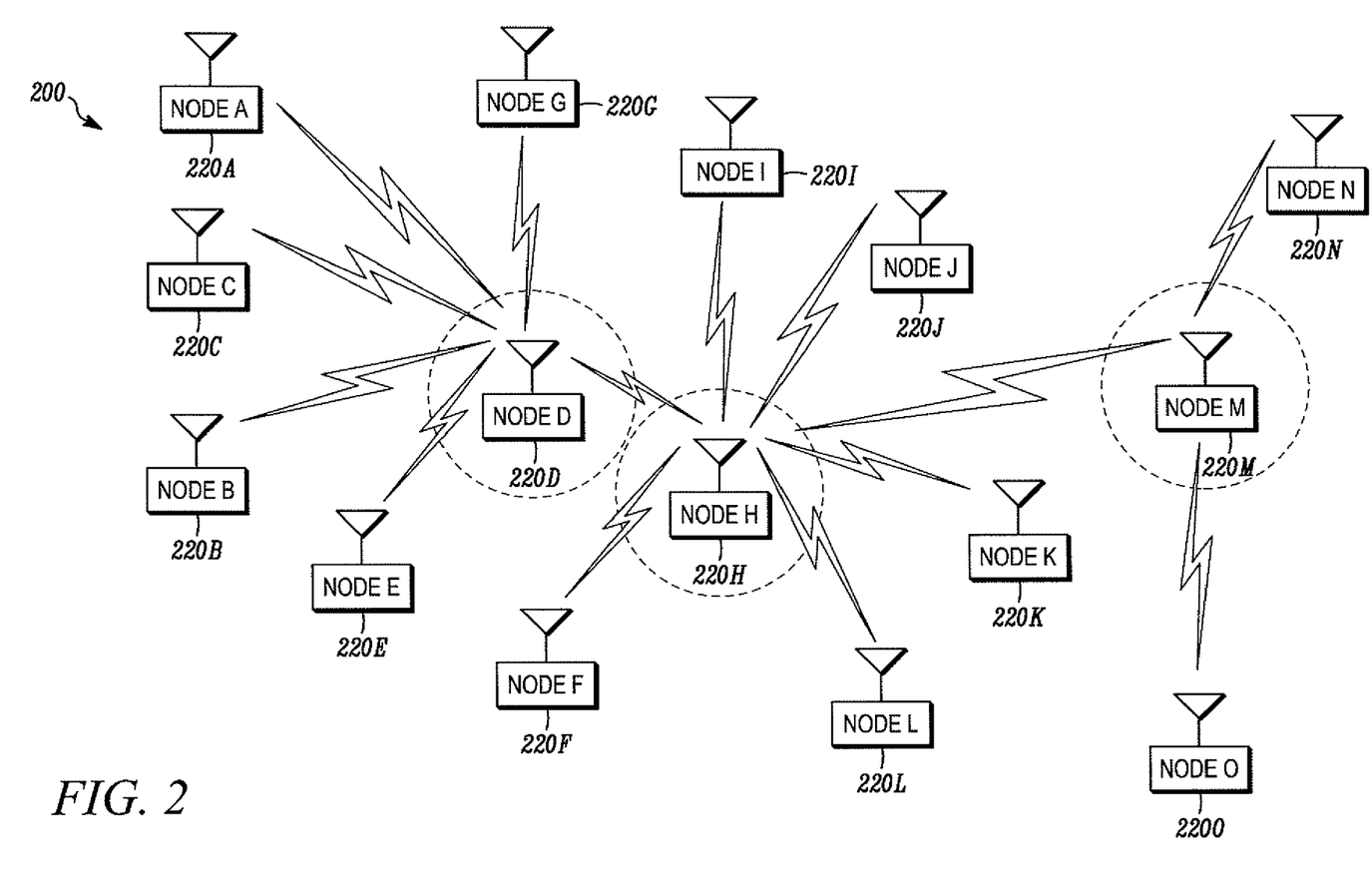
FIG. 2 is a block diagram of an exemplary peer-to-peer ad hoc communication network which illustrates a "relay" approach for broadcasting a broadcast packet throughout the network.

FIG. 2 is a block diagram of an exemplary peer-to-peer ad hoc communication network 200 which illustrates a "relay" approach for broadcasting a broadcast packet throughout the network. In FIG. 2, the broadcast packet originates at node A 220A and is relayed to other nodes 220B-220O in the network 200.

According to this relay approach, a relay node or nodes can be designated or selected as "relay nodes" to receive and transmit (or "relay") broadcast packets throughout the ad hoc network 200. In this example, it is assumed that node A 220A transmits a broadcast packet and that nodes designated by a dashed-line circle (e.g., node D 220D, node H 220H, and node M 220M) have been designated or selected as "relay" nodes. The nodes 220B, 220C, 220E, 220G, 220F, 220I, 220J, 220K, 220L, 220N, and 220O serve as receiver nodes.

When node A 220A broadcasts a broadcast packet, each node within range of node A 220A receives the packet and determines whether the received packet is a broadcast packet. If the received packet is a unicast packet (as opposed to a broadcast packet), the node transmits the received unicast packet to its appropriate neighbor node. If the received packet is a broadcast packet, then node determines whether or not the node itself has been designated or selected as a relay node. If the node is not a relay node, the node does not transmit the received packet to any other nodes. However, if the node is a relay node, then it transmits the received broadcast packet to each of its neighbor nodes. For instance, in FIG. 3 the relay nodes 220D, 220H, 220M can then relay the broadcast packet to their respective neighbor nodes 220B, 220C, 220E, 220G, 220F, 220I, 220J, 220K, 220L, 220N, 220O. Specifically, relay node 220D can relay the broadcast packet to its neighbor nodes 220B, 220C, 220E, 220G, relay node 220H can relay the broadcast packet to its neighbor nodes 220E, 220F, 220I, 220J, 220K, 220L, and relay node 220M can relay the broadcast packet to its neighbor nodes 220K, 220N, 220O. In comparison to the flooding approach described with reference to FIG. 1, the number of redundant transmissions can be reduced thereby improving the efficiency of the network 200 by reducing wasted bandwidth.

Figure 3:
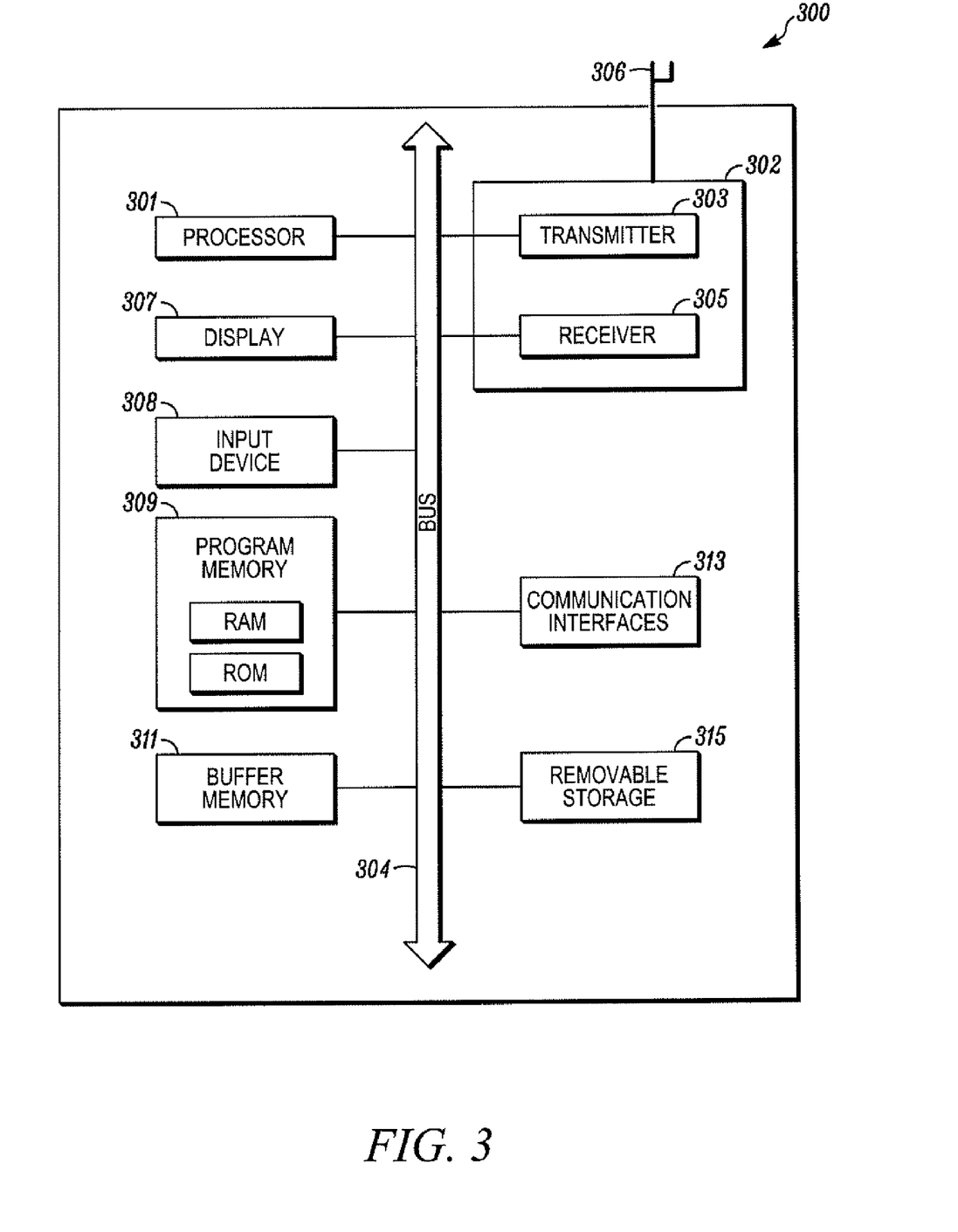
FIG. 3 is a block diagram of an exemplary node in accordance with some embodiments of the invention.

FIG. 3 is a block diagram of an exemplary node 300 in accordance with some embodiments of the invention. The node 300 comprises a processor 301, a transceiver 302 including transmitter circuitry 303 and receiver circuitry 305, an antenna 306, a display 307, an input device 308, a program memory 309 for storing operating instructions that are executed by the processor 301, a buffer memory 311, one or more communication interfaces 313, and a removable storage 315. Although not shown, the node 300 also preferably includes an antenna switch, duplexer, circulator, or other highly isolative means (not shown) for intermittently providing information packets from the transmitter circuitry 303 to the antenna 306 and from the antenna 306 to the receiver circuitry 305. The node 300 is preferably an integrated unit containing at least all the elements depicted in FIG. 3, as well as any other elements necessary for the node 300 to perform its particular electronic function. Alternatively, the node 300 may comprise a collection of appropriately interconnected units or devices, wherein such units or devices perform functions that are equivalent to the functions performed by the elements of the node 300. For example, the node 300 may comprise a laptop computer and a Wireless Local Area Network (WLAN) card.

The processor 301 preferably includes one or more microprocessors, microcontrollers, DSPs, state machines, logic circuitry, or any other device or devices that process information based on operational or programming instructions. Such operational or programming instructions are preferably stored in the program memory 309. The program memory 309 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 301 has one or more of its functions performed by a state machine or logic circuitry, the memory 309 containing the corresponding operational instructions may be embedded within the state machine or logic circuitry. The operations performed by the processor 301 and the rest of the node 300 are described in detail below.

The transmitter circuitry 303 and the receiver circuitry 305 enable the node 300 to communicate information packets to and acquire information packets from the other nodes. In this regard, the transmitter circuitry 303 and the receiver circuitry 305 include appropriate, conventional circuitry to enable digital or analog transmissions over a wireless communication channel. The transmitter circuitry 303 and the receiver circuitry 305 are designed to operate over an ad hoc networking air interface (e.g., BLUETOOTH, 802.11 WLAN, Wi-Fi, WiMAX, . . . , etc.).

The implementations of the transmitter circuitry 303 and the receiver circuitry 305 depend on the implementation of the node 300. For example, the transmitter circuitry 303 and the receiver circuitry 305 may be implemented as an appropriate wireless modem, or as conventional transmitting and receiving components of two-way wireless communication devices. In the event that the transmitter circuitry 303 and the receiver circuitry 305 are implemented as a wireless modem, the modem can be internal to the node 300 or insertable into the node 300 (e.g., embodied in a wireless RF modem implemented on a Personal Computer Memory Card International Association (PCMCIA) card). For a wireless communication device, the transmitter circuitry 303 and the receiver circuitry 305 are preferably implemented as part of the wireless device hardware and software architecture in accordance with known techniques. One of ordinary skill in the art will recognize that most, if not all, of the functions of the transmitter circuitry 303 and/or the receiver circuitry 305 may be implemented in a processor, such as the processor 301. However, the processor 301, the transmitter circuitry 303, and the receiver circuitry 305 have been artificially partitioned herein to facilitate a better understanding.

The receiver circuitry 305 is capable of receiving RF signals from at least one band and optionally more bands, if the communications with the proximate device are in a frequency band other than that of the network communications. The receiver circuitry 305 may optionally comprise a first receiver and a second receiver, or one receiver capable of receiving in two or more bandwidths. The receiver 305, depending on the mode of operation, may be attuned to receive, for example, Bluetooth or WLAN, such as 802.11, communication signals. The transceiver 302 includes at least one set of transmitter circuitry 303. The at least one transmitter 303 may be capable of transmitting to multiple devices potentially in multiple frequency bands.

The antenna 306 comprises any known or developed structure for radiating and receiving electromagnetic energy in the frequency range containing the wireless carrier frequencies.

The buffer memory 311 may be any form of volatile memory, such as RAM, and is used for temporarily storing received information packets in accordance with the present invention.

When the node 300 is constructed to receive video information from a video source, the node 300 preferably further includes a video decoder capable of decoding the current Moving Picture Experts Group (MPEG) standard or some other video decoding standard. When the node 300 is further capable of transmitting video information, the node 300 preferably further includes a video encoder capable of encoding the video data into at least one of the foregoing video standards. Such video encoder and decoder is preferably implemented as part of the processor 301.

Deterministic Relaying of Broadcast Information

Designating or selecting relay nodes can be problematic since the topology of an ad hoc network regularly changes. Thus, improved techniques for relaying broadcast information in an ordered manner throughout an ad hoc network would be desirable. As used herein, the term "broadcast information" refers to information which is broadcast to nodes in an ad hoc network. Broadcast information can include, but is not limited to, broadcast data, broadcast packet(s), broadcast message(s), or other broadcast signals. Broadcast information may come in the form of packetized audio, video and/or data information.

Techniques are provided for allowing a node in an ad hoc network to deterministically decide whether to relay broadcast information to another node in the ad hoc network. The node receives broadcast information from a broadcast relay node (BRN) and measures the relative received signal strength (RSS) of the broadcast information it receives. As used herein, the term "received signal strength (RSS)" refers to the level of the received signal. RSS can include, but is not limited to, a received signal strength (RSS) measurement, a power measurement, received signal power (RX Power), or other indicia of the received level of the WLAN signal or path loss from the source of the transmission to the receiver. The relative RSS is determined by comparing the measured RSS to thresholds. Based on the relative RSS, the node decides whether to relay the broadcast information. For example, if a node receives a broadcast message with a relatively high RSS above $T_H$ (e.g., is relatively close to a BRN), then it is preferable to let another node relay that broadcast message. By contrast, if a node receives a broadcast message with a relatively low RSS below $T_L$ (e.g., is relatively distant from a BRN), then it is preferable to let the node relay that broadcast message since it is less likely that it is in close proximity to other nodes which will relay the broadcast message.

If the measured RSS is greater than or equal to the low threshold, the node can also determine if the measured RSS is above a high threshold. If so, the node will not need to relay the broadcast message. For example, if a node receives a broadcast message with a relatively high RSS above $T_H$, it is relatively close to a BRN, and therefore it is less likely to need to relay the message to other nodes that are in close proximity. Therefore, if the RSS is greater than or equal to predetermined high threshold ($T_H$), then the node does not relay the broadcast message, but continues to receive other broadcast messages and measure their receive signal strength (RSS).

If the RSS is between the predetermined low threshold ($T_L$) and predetermined high threshold ($T_H$), it is unclear as to whether or not other nodes are better situated to serve as the BRN. In this case, the node does not relay the broadcast message, but instead waits for a waiting period ($T_w$) proportional to the RSS minus $T_L$ to give its neighbor nodes that receive the broadcast message with a lower RSS an opportunity to relay the message first. Here, the $T_w$ can be proportional to the RSS minus $T_L$ to reduce latency by allowing nodes to begin relaying before the time proportional to $T_L$ elapses. The node continues to monitor broadcast messages from other nodes during the waiting period ($T_w$). If during this waiting period, the node receives the broadcast message again with a high RSS (above $T_H$), then as above, the node can cancel its relay of the broadcast message. Thus, the node can determine whether the same broadcast message was transmitted by a neighbor node during the waiting period with a RSS above the high threshold, and if so, may cancel the relay of the broadcast information, and continue to receive other broadcast information, and measure the RSS of the other broadcast information.

However, if during the waiting period, the node fails to receive the broadcast message from another node above threshold $T_H$, then the node relays the broadcast message since it is likely that other nearby nodes have not received the message with a high RSS (above $T_H$) or possibly other nodes further away have not received the message at all. Thus, if the same broadcast information was not received by the node during the waiting period with a RSS above the high threshold, then the node relays the broadcast information.

Thus, in making this decision, the node may determine if the measured RSS is below a low threshold, and can relay the broadcast information to neighbor nodes if the measured RSS is below the low threshold. For example, if the RSS is less than a predetermined low threshold ($T_L$), then the node can automatically relay the broadcast message without initially deferring to other nodes in the vicinity of the node. If a node receives a broadcast message with a relatively low RSS below $T_L$ (e.g., is relatively distant from a BRN), then it is preferable to let the node relay that broadcast message immediately in order to reduce latency, since it is less likely that other nodes in close proximity have received the broadcast message with a high RSS (above $T_H$). In some implementations, the node may dynamically adjust the low threshold based on the number of neighbor nodes by decreasing the low threshold as the number of neighbor nodes increases.

In some implementations, the node may dynamically adjust the high threshold based on the number of neighbor nodes by increasing the high threshold as the number of neighbor nodes decreases.

FIG. 4 is a flowchart showing an exemplary method for allowing a node in an ad hoc network to deterministically decide whether or not to relay broadcast information to another node in the ad hoc network in accordance with some embodiments of the invention. Each node in the ad hoc network dynamically and deterministically decides on a message-by-message basis whether or not to relay a broadcast message. This decision can be based on a number of factors. In one embodiment, received signal strength (RSS) measurements are used in conjunction with predetermined thresholds to determine whether or not to relay a broadcast packet. While each node in the ad hoc network implements the techniques shown in FIG. 4; however, for simplicity of discussion, the description of FIG. 4 will be made with reference to a single node.

At step 410, the node receives a broadcast message and measures the receive signal strength (RSS) of the broadcast message.

Step 420 is optional and can be used to ensure that the node relays the broadcast message if its RSS is below a certain value. Step 420 provides an enhancement which utilizes a predetermined low threshold ($T_L$) to permit nodes to transmit without initially deferring to nodes with lower RSS, given adequate collision avoidance mechanisms. This enables more rapid propagation of the broadcast message without delay. At step 420, the node determines if the measured RSS of the received broadcast message is below a predetermined low threshold ($T_L$). When the node determines that the measured RSS of the broadcast message is below $T_L$, then the node relays the broadcast message to its neighbor nodes without delay at step 460, and the process then loops back to step 410 where the node continues to monitor broadcast messages and measure RSS of other broadcast messages. Thus, once a node has relayed the message or determined that it does not need to relay the message, step 410 is repeated for the next broadcast message.

When the node determines that the measured RSS of the broadcast message is at or above $T_L$ at step 420, then at step 430, the node determines if the measured RSS of the broadcast message is above a predetermined high threshold ($T_H$).

When the node determines that the measured RSS of the broadcast message is above a predetermined high threshold ($T_H$) at step 430, then the process loops back to step 410, since the node does not need to relay the message. The node continues to receive other broadcast messages and measure the receive signal strength (RSS) of those broadcast messages.

When the node determines that measured RSS of the broadcast message is at or below a predetermined high threshold ($T_H$) at step 430, then the node does not relay the broadcast message to its neighbor nodes, but instead waits for a waiting period ($T_w$) at step 440, giving its neighbor nodes that received the message with a lower RSS an opportunity to relay the broadcast message. The node continues to monitor broadcast messages during the waiting period ($T_w$) at step 440. The waiting period ($T_w$) increases with the RSS. In other words, when the node receives a broadcast message with a relatively high RSS (between the predetermined low threshold ($T_L$) and the predetermined high threshold ($T_H$)), then the node waits for a waiting period ($T_w$) to allow other nodes an opportunity to relay the broadcast message first.

The waiting period ($T_w$) at step 440 can be determined by several different techniques. In one embodiment, the waiting period ($T_w$) or waiting interval is proportional to the measured RSS of the broadcast message minus $T_L$. In another embodiment, the waiting period ($T_w$) or waiting interval is randomly selected or can be a random waiting interval biased by the measured RSS of the broadcast message. For example, the waiting period ($T_w$) or waiting interval can be reduced or shortened for a broadcast message with a lower RSS. This enables other nodes that are typically more distant to relay the message first and this may eliminate the need for the node to relay or rebroadcast the message itself.

At step 450, the node determines whether the same broadcast message was relayed or "rebroadcast" by a neighbor node during the waiting period ($T_w$) such that the node receives the same message again with a RSS above $T_H$. When the node determines that the same broadcast message was received during the waiting period ($T_w$) with a RSS above $T_L$, then the node does not relay the broadcast message and cancels the remaining waiting interval, and the process loops back to step 410 where the node continues to receive other broadcast messages and measure the receive signal strength (RSS) of those broadcast messages.

When the node determines that the same broadcast message was not received by the node during the waiting period ($T_w$) or was received during the waiting period ($T_w$) but with a RSS at or below $T_H$, then, at the end of the waiting interval, the node initiates relay transmission of the broadcast message, and the process loops back to step 410 where the node continues to receive other broadcast messages and measure the receive signal strength (RSS) of those broadcast messages.

According to some implementations, additional enhancements to the efficient broadcast techniques, described above with respect to FIG. 4, can be provided which can improve the reliability of these efficient broadcast techniques regardless of rapid topology changes. These additional enhancements can include, for example, dynamic adjustment of the predetermined high threshold ($T_H$) as a function of the number of neighbor nodes and/or in response to requests from nodes which fail to receive periodic broadcast test messages (FIG. 5), in response to non-receipt of an expected reply (FIG. 6), and/or in response to more rapid propagation of broadcasts based on a second threshold (FIG. 7).

Dynamically Adjusting $T_H$

At step 430, the predetermined high threshold ($T_H$) can be dynamically adjusted based on the number of neighbor nodes. Generally, the predetermined high threshold ($T_H$) can be adjusted to a higher value if the number of neighbor nodes is relatively small (e.g., adjust to ∞ if number of neighbor nodes is ≦2) and to a lower value approaching $T_H$ if the number of neighbor nodes is relatively large. An exemplary process for dynamically adjusting the predetermined high threshold ($T_H$) will be discussed in more detail with reference to FIG. 5.

Figure 5:
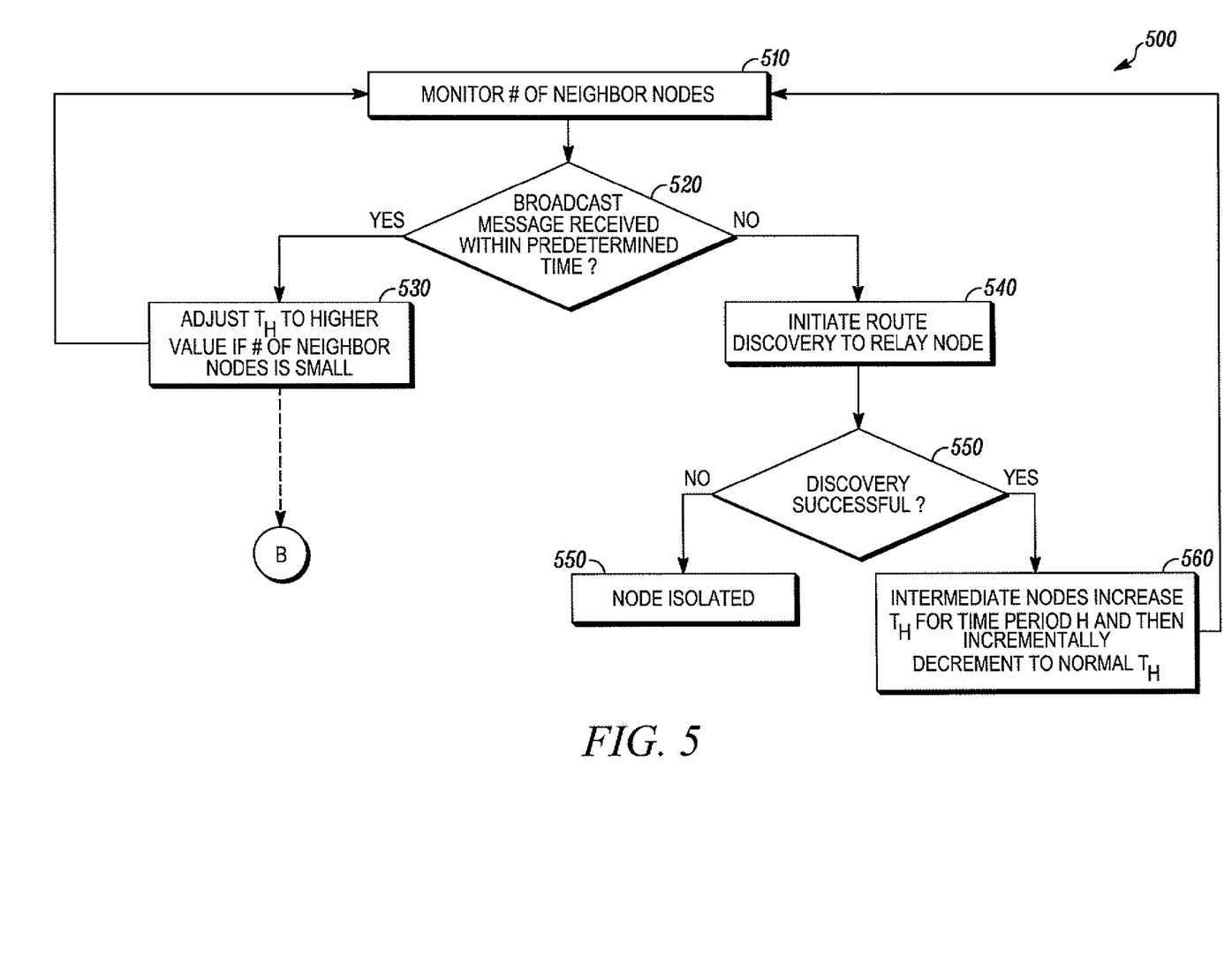
FIG. 5 is a flowchart showing an exemplary method for dynamically adjusting a predetermined high threshold based on the number of neighbor nodes in accordance with some embodiments of the invention.

FIG. 5 is a flowchart showing an exemplary method for dynamically adjusting the predetermined high threshold ($T_H$) based on the number of neighbor nodes, and for adjusting the high threshold ($T_H$) used by intermediate nodes in accordance with some embodiments of the invention. To enhance the reliability of the efficient broadcast techniques described above with reference to FIG. 4, the predetermined high threshold ($T_H$) can be dynamically adjusted in response to requests from nodes which fail to receive (periodic) broadcast test messages.

At step 510, the node regularly or periodically monitors the number of neighbor nodes it has at a given time for (periodically transmitted) broadcast test messages. At step 520, the node determines whether a broadcast test message has been received within a predetermined time interval.

When a broadcast test message is received by the node within the predetermined time interval, then at step 530, the predetermined high threshold ($T_H$) can be dynamically adjusted as a function of the number of neighbor nodes to further enhance the reliability of the efficient broadcast techniques described above with reference to FIG. 4. Generally, the predetermined high threshold ($T_H$) can be adjusted to a higher value if the number of neighbor nodes is relatively small. For example, if a node has few neighbors, such as if it is on the fringe of an ad hoc network, then the potential that one or more neighbors is in communication range of any other node is relatively decreased. It is more likely that another node can only receive broadcast from it and not from any other node. Therefore, a node with few neighbors should utilize a higher $T_H$ than a node with many neighbors, and the high threshold ($T_H$) can be increased to increase the likelihood that the node will rebroadcast and reach the other fringe node(s).

For instance, in the case where a node only has two neighbors (and one of the two must be a relay or source of the broadcast), the node should set $T_H$ to a very high number (e.g., approaching infinity (∞)) so that the broadcast message is always relayed to ensure broadcast coverage of the second neighbor. By contrast, the predetermined high threshold ($T_H$) can be adjusted to a lower value if the number of neighbor nodes is relatively large, since other typically more distant neighbors are likely to relay the broadcast message.

When a node fails to receive a broadcast test message within a predetermined time interval, this indicates that the existing backbone network of broadcast relay nodes (BRNs) is insufficient and that additional intermediate BRNs should be selected and used to repair the backbone. When the node determines that a broadcast test message has not been received by the node within the predetermined time at step 530, then the process proceeds to step 540.

At step 540, the node that failed to receive a broadcast test message then initiates route discovery through its neighbor nodes to try to discover/find a node that has received a broadcast message within the predetermined time interval.

Typically a node that fails to receive a broadcast message is out of range of a relay and is therefore unable to receive a broadcast message. Other neighbors of this node may be within range of a relay node. The node that fails to receive the broadcast message can communicate with its neighbor nodes to attempt to discover a route to a BRN using one of several known techniques. Examples of common route discovery techniques for discovering communication routes to other nodes in the network can include, for example, an Ad hoc on Demand Distance Vector (AODV) route discovery technique, Dynamic Source Routing (DSR) route discovery technique which is disclosed in Johnson et al., "Dynamic Source Routing in Ad hoc Wireless Networks", Mobile Computing, 1996, a Temporally Ordered Routing Algorithm (TORA) route discovery technique, Destination-Sequenced Distance Vector (DSDV) route discovery technique which is disclosed in U.S. Pat. No. 5,412,654 to Perkins, and a Zone Routing Protocol (ZRP) route discovery technique which is disclosed in U.S. Pat. No. 6,304,556 to Haas, each of which is incorporated by reference herein in its entirety.

According to one technique, the node that failed to receive a test message initiates the route discovery process by broadcasting a route request packet that includes the address of the source and a unique identification number. The route request packet is sent from the node that fails to receive a test message to one of the BRNs through intermediate nodes on several different paths. Each intermediate node checks whether it knows of a route to one of the BRNs. If it does not, it appends its address to the route record of the packet and forwards the packet to its neighbor nodes. To limit the number of route requests propagated, a node processes the route request packet only if it has not already seen the packet and its address is not present in the route record of the packet.

A route reply is generated when either one of the BRNs or an intermediate node with current information about one of the BRNs receives the route request packet. A route request packet reaching such a node already contains, in its route record, the sequence of hops taken from the node that fails to receive a test message to this node. As the route request packet propagates through the network, a route record is formed. If the route reply is generated by one of the BRNs, then it places the route record from the route request packet into the route reply packet. On the other hand, if the node generating the route reply is an intermediate node, then it appends its cached route to one of the BRNs to the route record of the route request packet and puts that into the route reply packet. To send the route reply packet, the responding node must have a route to the node that failed to receive a test message and initiated the route discovery. If it has a route to the node that fails to receive a test message in its route cache, it can use that route.

At step 550 it is determined whether route discovery was successful (e.g., whether a route was found).

When route discovery is successful, then at step 560, the node determines intermediate node or nodes which can connect the node to one of the BRNs, and instructs/requests that the intermediate node or nodes increase the value of their $T_H$ for a time period to ensure that the initiating node will receive broadcast messages. The intermediate nodes maintain this increased threshold for a time period (H), and thereafter incrementally decrease or decrement the increased value of $T_H$, after each subsequent time period in an attempt to revert to the original or normal value of $T_H$. However, if the intermediate nodes receive another request to increase their thresholds before reaching the original/normal value of $T_H$ (or shortly thereafter), the intermediate nodes then increase the threshold again (possibly to an even higher value of $T_H$) and maintain the increased threshold for a longer period time period (nH) before again beginning to incrementally decrease the threshold, where n is a multiplier >1. Thereafter, the process loops back to step 510, where the node continues to monitor the number of neighbor nodes it has.

When at step 550 it is determined that a path to one of the BRNs cannot be found, then at step 570, it is determined that the node is an isolated node and is no longer part of the original ad hoc network 500. The isolated node can continue attempts to rejoin the original network, join another network, or form a new network. This can be accomplished using an appropriate route discovery technique such as those described above.

Figure 6:
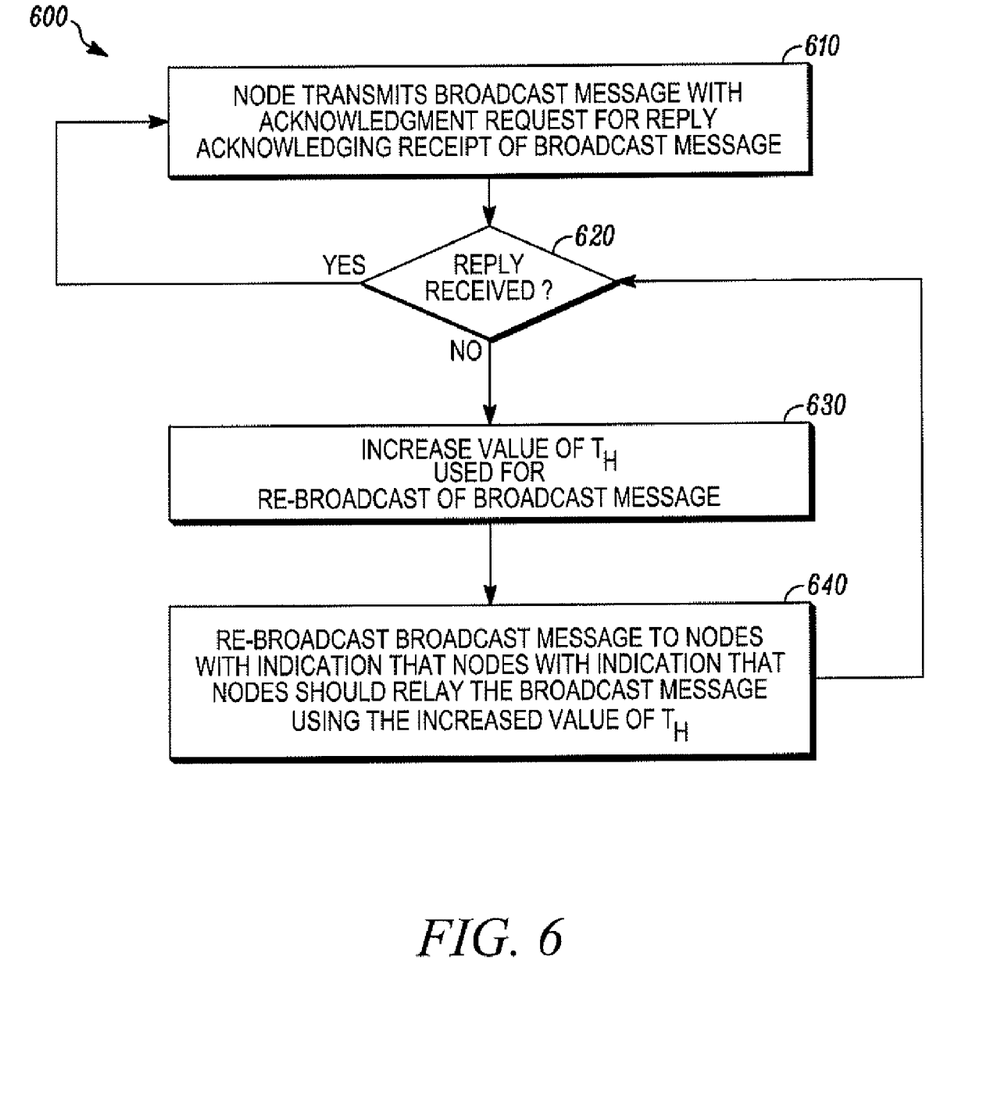
FIG. 6 is a flowchart showing an exemplary method for dynamically adjusting the predetermined high threshold ($T_H$) during a rebroadcast of a broadcast message when an expected reply is not received in response to the original transmission of broadcast message in accordance with some embodiments of the invention.
Figure 7:
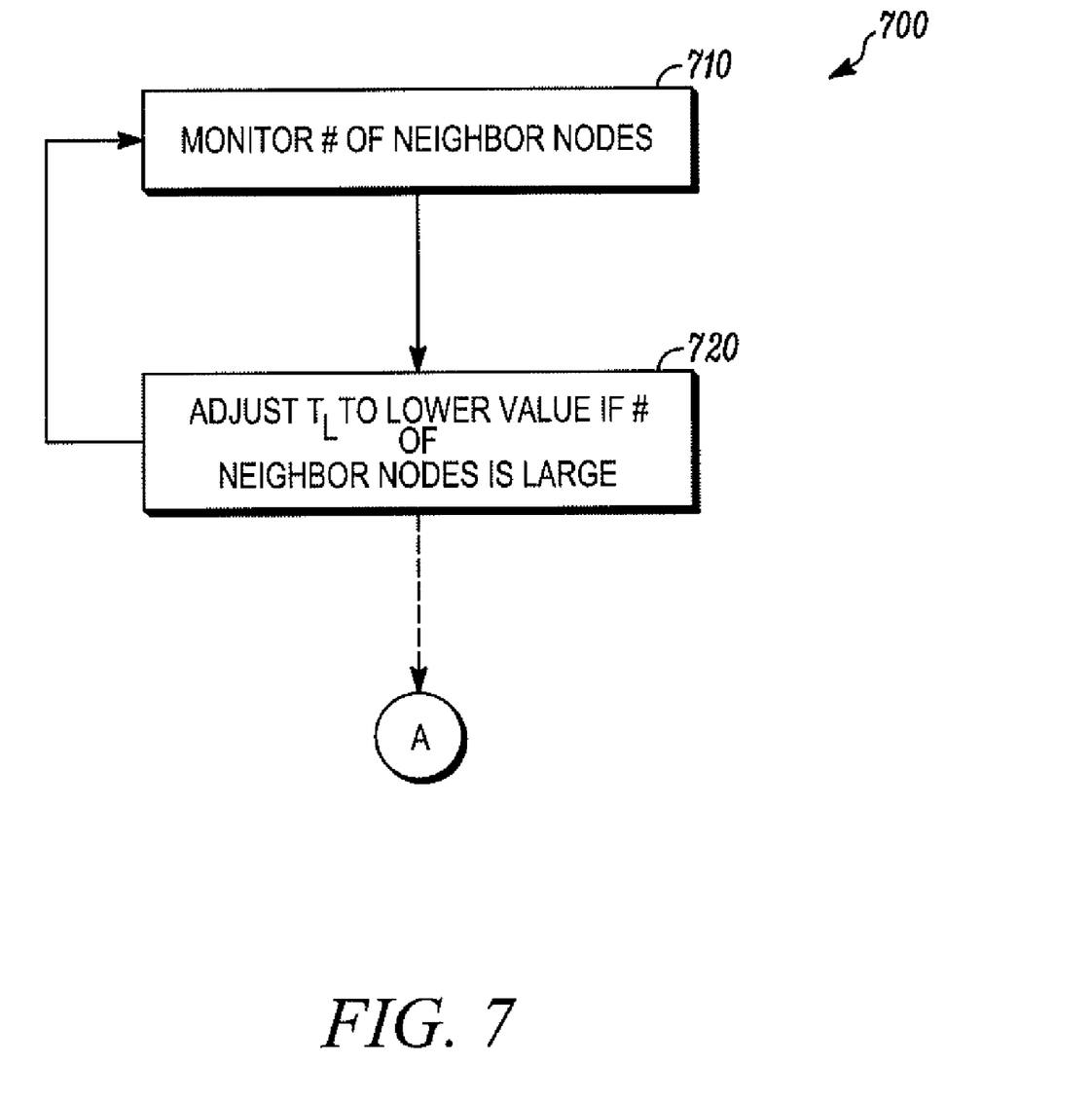
FIG. 7 is a flowchart showing an exemplary method for dynamically adjusting the predetermined low threshold based on the number of neighbor nodes in accordance with some embodiments of the invention.

Dynamically Adjusting $T_H$ in Rebroadcasts of a Broadcast Message When an Expected Reply is not Received by the Node Initiating the Broadcast Message FIG. 6 is a flowchart showing an exemplary method for dynamically adjusting the predetermined high threshold ($T_H$) during a rebroadcast of a broadcast message when an expected reply is not received in response to the original transmission of broadcast message in accordance with some embodiments of the invention. According to this implementation, the reliability of the efficient broadcast techniques described above with reference to FIG. 4 can be further enhanced by dynamically adjusting the predetermined high threshold ($T_H$) during a re-broadcast of a broadcast message from an originating node if the originating node fails to receive an expected reply (e.g., a route discovery request or other acknowledgement (ACK)) in response to the original broadcast message.

At step 610, the originating node transmits a broadcast message which includes a first acknowledgement request requesting a specific receiving node(s) to send a reply acknowledging receipt of the broadcast message. After waiting for a short time period, at step 620, the originating node determines whether it has received a reply acknowledgement message from the intended recipient node(s) confirming receipt of the broadcast message. If the originating node determines it has received a reply acknowledgement message, then the process loops back to step 610 since the broadcast was successful and no other action is required. Thereafter the originating node may transmit another broadcast message which includes another acknowledgement request asking any receiving node to send a reply acknowledging receipt of the broadcast message.

However, when, at step 620, the originating node determines it has not received a reply acknowledgement message (and therefore can not confirm that the intended recipient nodes received the broadcast message), then the process proceeds to step 630 where the originating node increases the value of the predetermined high threshold ($T_H$) that will be used to re-broadcast the broadcast message. In other words, if the originating node expects a reply to the message, such as a route discovery request, and it is not received, the reliability of a re-broadcast of the broadcast message can be increased by increasing the predetermined high threshold ($T_H$) to be used for the re-broadcast.

At this point, the originating node provides an indicator in updated version of the broadcast message. This indicator instructs nodes in the network to use the increased value of the predetermined high threshold ($T_H$) when relaying the updated version of the broadcast message. This may be accomplished, for example, by setting bits in the header of the rebroadcast message to indicate that a higher value of the predetermined high threshold ($T_H$) should be used when relaying the re-broadcast broadcast message.

At step 640, the originating node rebroadcasts the first broadcast message with the indicator to other nodes. As a result, the nodes know to use the increased value of the predetermined high threshold ($T_H$) when relaying the updated version of the first broadcast message. This increases the reliability of all nodes receiving the broadcast message at the expense of additional broadcast transmissions. The process then loops back to step 620 where the originating node determines whether it has received a reply acknowledgement message from the intended recipient nodes (e.g., neighbor nodes) confirming receipt of the first broadcast message. Note that if a reply is still not received, it is possible to re-broadcast the message again with an indication of an even higher value of $T_H$ to further increase the reliability of all nodes receiving the broadcast message.

Dynamically Adjusting $T_L$

According to still another implementation, the reliability of the efficient broadcast techniques described above with reference to FIG. 4 can be enhanced, at step 420 of FIG. 4, by dynamically adjusting the predetermined low threshold ($T_L$) in response to more rapid propagation of broadcasts. For example, at step 420, the predetermined low threshold ($T_L$) can be dynamically adjusted based on the number of neighbor nodes. For example, a node with many neighbors can use a lower value for the predetermined low threshold ($T_L$) since the additional delay is likely to be shorter and the possibility of a collision is greater. Generally, the predetermined low threshold ($T_L$) can be adjusted to a lower value if the number of neighbor nodes is relatively high (e.g., adjust to near 0 if number of neighbor nodes is $\geqq \leqq 50$) and to a higher value if the number of neighbor nodes is relatively small. An exemplary process for dynamically adjusting the predetermined low threshold ($T_L$) will be discussed in more detail with reference to FIG. 7.

FIG. 7 is a flowchart showing an exemplary method for dynamically adjusting the predetermined low threshold ($T_L$) based on the number of neighbor nodes in accordance with some embodiments of the invention.

At step 710, the node regularly or periodically monitors the number of neighbor nodes it has at a given time for (periodically transmitted) broadcast test messages.

At step 720, the predetermined low threshold ($T_L$) can be dynamically adjusted as a function of the number of neighbor nodes to further enhance the reliability of the efficient broadcast techniques described above with reference to FIG. 4. Generally, the predetermined low threshold ($T_L$) can be adjusted to a lower value if the number of neighbor nodes is relatively large. For example, if a node has many neighbors, such as at a central location of an ad hoc network, then the potential that one or more neighbors is in communication range of any other node is increased. Therefore, a node with many neighbors should utilize a lower value of $T_L$ than a node with few neighbors. For instance, in the case where a node has 50 neighbors or more, the node should set $T_L$ to a very low number (e.g., approaching 0) so that the broadcast message is not relayed to decrease the likelihood of collisions with broadcast messages from other neighbors. By contrast, the predetermined low threshold ($T_L$) can be adjusted to a higher value if the number of neighbor nodes is relatively small since the likelihood of collisions is lessened.

The disclosed embodiments relate to techniques for use in any ad hoc network which can improve the efficiency of broadcasts and prevent excessive retransmissions/collisions of broadcast messages. The disclosed techniques are particularly well-suited for efficient broadcast of messages in high mobility ad hoc networks where topology changes are more frequent, such as those in which nodes are located in or on rapidly moving vehicles and/or in situations in which a large number of vehicles are in very close proximity (e.g., densely populated vehicles.

In the foregoing specification, specific embodiments of the present invention have been described. However, one of ordinary skill in the art appreciates that various modifications and changes can be made without departing from the scope of the present invention as set forth in the claims below. For example, while the description above describes techniques for allowing a node to deterministically decide whether to relay broadcast information to another node in an ad hoc network, it should be appreciated that these broadcast concepts can also be applied to multicast groups as well, where a subset of the nodes in the ad hoc network belongs to a multicast group. In such cases, the techniques described above could be used by multicast relay nodes (MRNs) for distributing multicast messages (MCMs). When there are multiple multicast groups, then only the MRN for a particular group will relay a multicast message for that particular group. In addition, service types may be used as a basis for establishing multicast groups, so that the MRNs are more likely to relay messages for their own service type. Since different service types may have different resource requirements, this helps ensure that MRNs are well matched to their service type and that the MRNs of one service type will not be burdened with relaying the multicast messages of another service type.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a node of an ad hoc network, a method for deterministically deciding whether to relay broadcast information to a neighbor node in the ad hoc network including a backbone network including at least one relay node, comprising:

receiving the broadcast information from another node in the ad hoc network;

measuring a received signal strength (RSS) of the broadcast information;

deciding whether to relay the broadcast information based on the RSS of the broadcast information, the deciding comprising determining whether the RSS is below a low threshold, and whether the RSS is above a high threshold;

relaying the broadcast information from the node to the neighbor node if the RSS is below the low threshold;

never relaying the broadcast information from the node to the neighbor node if the RSS is above the high threshold; and dynamically adjusting at least one of the low or high thresholds based on the number of neighbor nodes.

2. The method according to claim 1, further comprising:

dynamically adjusting the low threshold based on the number of neighbor nodes by decreasing the low threshold as the number of neighbor nodes increases.

3. The method according to claim 2, further comprising:

determining whether the broadcast information has been received within a time interval; and attempting to repair the backbone network by discovering an intermediate node that has received the broadcast information within the time interval if the broadcast information is not received by the node within the time interval.

4. The method according to claim 3, wherein attempting to repair the backbone network, comprises:

initiating route discovery through neighbor nodes to try to discover a route to the intermediate node; and determining at least one intermediate node connected to a relay node if a route was found to the intermediate node; and requesting that the intermediate node increase its value of the high threshold for a time period and thereafter incrementally decrease the increased value of the high threshold during each subsequent time period.

5. The method according to claim 1, further comprising:

waiting for a waiting period before relaying the broadcast information to neighbor nodes if the measured RSS of the broadcast information is less than or equal to the high threshold, the waiting period being sufficient to provide the node an opportunity to receive an indication from the neighbor nodes that the broadcast information was received at at least one of the neighbor nodes with a lower RSS than that received by the node during the waiting period, wherein the broadcast information is received during the waiting period.

6. The method according to claim 5, further comprising:

dynamically adjusting the high threshold based on the number of neighbor nodes by increasing the high threshold as the number of neighbor nodes decreases.

7. The method according to claim 6, further comprising:

determining whether the broadcast information has been received within a time interval; and attempting to repair the backbone network by discovering an intermediate node that has received the broadcast information within the time interval if the broadcast information is not received by the node within the time interval.

8. The method according to claim 7, wherein attempting to repair the backbone network, comprises:

initiating route discovery through the neighbor nodes to try to discover a route to the intermediate node;

determining at least one intermediate node connected to a relay node if a route to the intermediate node was found; and requesting that the intermediate node increase its value of the high threshold for a time period and thereafter incrementally decrease the increased value of the high threshold during each subsequent time period.

9. The method according to claim 6, further comprising:

receiving other broadcast information that is different from the broadcast information without relaying the broadcast information if the measured RSS of the broadcast information is above the high threshold; and measuring the RSS of the other broadcast information.

10. The method according to claim 6, wherein a duration of the waiting period is proportional to the measured RSS of the broadcast information.

11. The method according to claim 10, further comprising:

determining whether the same broadcast information as the broadcast information was received during the waiting period and, if received, whether the same broadcast information has a RSS above the high threshold.

12. The method according to claim 11, further comprising:

canceling relay of the broadcast information if the same broadcast information was received during the waiting period with a RSS above the high threshold.

13. The method according to claim 11, further comprising:

relaying the broadcast information if the same broadcast information was not received during the waiting period with a RSS above the high threshold;

receiving other broadcast information that is different from the broadcast information; and measuring the RSS of the other broadcast information.

14. The method according to claim 1, further comprising:

dynamically adjusting the high threshold based on the number of neighbor nodes by increasing the high threshold as the number of neighbor nodes decreases.

15. A node configured to deterministically decide whether to relay broadcast information to another node in an ad hoc network, comprising:

a receiver configured to receive the broadcast information from a different node in the ad hoc network;

a processor configured to:
measure a received signal strength (RSS) of the broadcast information,
decide whether to relay the broadcast information based on the RSS of the broadcast information, the decision based on whether the measured RSS of the received broadcast information is below a low threshold and whether the measured RSS is above a high threshold,
generate a relay command to relay the broadcast information when the measured RSS of the broadcast information is below the low threshold,
never generate the relay command when the measured RSS of the broadcast information is above the high threshold,
dynamically adjust at least one of the low or high thresholds based on the number of neighbor nodes; and a transmitter configured to receive the relay command and transmit the broadcast information to a neighbor node in the ad hoc network.

16. The node according to claim 15, wherein the processor is further configured to monitor the number of neighbor nodes and to decrease the low threshold as the number of neighbor nodes increases.

17. The node according to claim 15, wherein the processor is further configured to:

wait for a waiting period before relaying the broadcast information to the neighbor nodes when the measured RSS of the broadcast information is less than or equal to the high threshold, and cancel the relay the broadcast information if the same information as the broadcast information is received during the waiting period with a RSS above the high threshold.

18. The node according to claim 17, wherein the processor is further configured to monitor the number of neighbor nodes, determine whether broadcast information has been received within a time interval, and increase the high threshold as a function of the number of neighbor nodes if the broadcast information is received within the time interval, wherein the high threshold increases as the number of neighbor nodes decreases.

19. The node according to claim 17, wherein the duration of the waiting period is proportional to the measured RSS of the broadcast information, and wherein the processor is further configured to determine whether the same broadcast information was received during the waiting period with a RSS above the high threshold, and wherein the processor is further configured to cancel relay of the broadcast information if the same broadcast information was received during the waiting period with a RSS above the high threshold, and to relay the broadcast information if the same broadcast information was not received during the waiting period with a RSS above the high threshold.

20. The node according to claim 15, wherein the processor is further configured to:

determine whether the broadcast information has been received within a time interval; and attempt to repair the backbone network by discovering an intermediate node that has received the broadcast information within a time interval if the broadcast information is not received by the node within the time interval.

21. The node according to claim 20, wherein to attempt to repair the background, the processor is further configured to:

initiate route discovery through the neighbor nodes to try to discover a route to the intermediate node; and determine at least one intermediate node connected to a relay node in the ad hoc network if a route was found to the intermediate node; and request that the intermediate node increase its value of the high threshold for a time period and thereafter incrementally decrease the increased value of high threshold during each subsequent time period.

22. The node according to claim 15, wherein the processor is further configured to:

receive other broadcast information that is different from the broadcast information without relaying the broadcast information if the measured RSS of the broadcast information is above the high threshold; and measure the RSS of the other broadcast information.

* * * * *

UNITED STATES PATENT AND TRADEMARK OFFICE
CERTIFICATE OF CORRECTION

PATENT NO.         : 7,697,450 B2
APPLICATION NO.    : 11/289833
DATED              : April 13, 2010
INVENTOR(S)        : D'Amico et al.

Page 1 of 1

It is certified that error appears in the above-identified patent and that said Letters Patent is hereby corrected as shown below:

IN THE DRAWINGS

In Fig. 1, Sheet 1 of 7, delete Tag "1200" and insert Tag -- 120O --, therefor.

In Fig. 2, Sheet 2 of 7, delete Tag "2200" and insert Tag -- 220O --, therefor.

IN THE SPECIFICATION

In Column 10, Line 66, delete "$T_L$," and insert -- $T_H$, --, therefor.

In Column 14, Line 54, delete "$\geqq \leqq$" and insert -- $\geqq$ --, therefor.

Signed and Sealed this
Twenty-ninth Day of May, 2012

David J. Kappos
*Director of the United States Patent and Trademark Office*